United States Patent
Kobayashi et al.

(10) Patent No.: US 7,097,567 B2
(45) Date of Patent: Aug. 29, 2006

(54) CONSTANT VELOCITY UNIVERSAL JOINT

(75) Inventors: Masazumi Kobayashi, Shizuoka-ken (JP); Kazuhiro Azuma, Shizuoka-ken (JP); Tohru Nakagawa, Shizuoka-ken (JP); Isamu Tanimoto, Shizuoka-ken (JP); Katsuyuki Ikei, Shizuoka-ken (JP); Hisaaki Kura, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 11/191,029

(22) Filed: Jul. 28, 2005

(65) Prior Publication Data

US 2005/0261067 A1 Nov. 24, 2005

Related U.S. Application Data

(63) Continuation of application No. 10/124,732, filed on Apr. 18, 2002, now abandoned.

(30) Foreign Application Priority Data

Apr. 24, 2001 (JP) ............................ 2001-126166
Jun. 25, 2001 (JP) ............................ 2001-191553

(51) Int. Cl.
 *F16D 3/224* (2006.01)
(52) U.S. Cl. ...................... 464/145; 464/906
(58) Field of Classification Search ................ 464/140, 464/145, 146, 906
 See application file for complete search history.

(56) References Cited

U.S. PATENT DOCUMENTS

| | | | |
|---|---|---|---|
| 2,838,919 A | 6/1958 | Cull | |
| 4,494,941 A | 1/1985 | Hirai et al. | |
| 4,610,643 A | 9/1986 | Krude | |
| 4,820,240 A | 4/1989 | Girguis | |
| 4,968,287 A | 11/1990 | Jacob | |
| 5,692,960 A | 12/1997 | Sugiyama et al. | |
| 6,071,210 A | 6/2000 | Kato et al. | |
| 6,120,382 A | 9/2000 | Sone et al. | |
| 6,299,542 B1 | 10/2001 | Ouchi et al. | |
| 6,383,082 B1 | 5/2002 | Declas | |
| 6,431,988 B1 | 8/2002 | Tone | |

FOREIGN PATENT DOCUMENTS

| | | |
|---|---|---|
| EP | 0 802 341 A | 10/1997 |
| EP | 0 950 824 A2 | 10/1999 |
| FR | 2 798 709 A | 3/2001 |
| GB | 637718 A | 5/1950 |

*Primary Examiner*—Greg Binda
(74) *Attorney, Agent, or Firm*—Arent Fox, PLLC.

(57) ABSTRACT

A constant velocity universal joint has an outer joint member having eight curved track grooves axially extending along an inner circumferential surface, an inner joint member having eight curved track grooves axially extending along an outer circumferential surface, eight balls respectively arranged in eight ball tracks provided as pairs of the track grooves of the outer and inner joint members. The center of each track groove of the outer joint member is axially displaced a predetermined distance from the spherical center of the inner circumferential surface. The center of each track groove of the inner joint member is axially displaced the same distance from the spherical center of the outer circumferential surface in the direction opposite to that of the outer joint member. A PCD gap in the ball track is in the range of 5 μm to 50 μm.

7 Claims, 6 Drawing Sheets

Fig. 4

TEST CONDITIONS ; T=726N·m, N=230rpm, θ =6deg

| PCD GAP (μm) | SPEC | OPERATION TIME (hr) | | | | |
|---|---|---|---|---|---|---|
| 30 | A | ○ | ○ | ○ | ○ | ○ |
|    | B | ○ | ○ | ○ | ○ | ○ |
| 50 | A | ○ | ○ | ○ | ○ | ○ |
|    | B | ○ | ○ | ○ | ○ | ○ |
| 70 | A | ○ | ○ | ○ | ○ | ○ |
|    | B | ○ | ○ | △ | × | |
| 100 | A | ○ | ○ | ○ | △ | × |
|     | B | ○ | ○ | ○ | × | |
| 120 | A | ○ | × | | | |
|     | B | ○ | × | | | |
| 130 | A | × | | | | |
|     | B | × | | | | |

Note: Explanation of the symbol used in the table
○ : Excellent
△ : Passing(with a little problem)
× : Failure

Fig. 5

TEST CONDITIONS ; T=186N·m, N=1700rpm, θ =6deg

| POCKET GAP (μm) | | OPERATION TIME (hr) | | | | |
|---|---|---|---|---|---|---|
| -20 | A | ○ | ○ | ○ | ○ | ○ |
|     | B | ○ | ○ | ○ | ○ | ○ |
| -30 | A | ○ | ○ | ○ | ○ | ○ |
|     | B | ○ | ○ | ○ | ○ | ○ |
| -45 | A | ○ | △ | △ | × | |
|     | B | ○ | △ | × | | |

Note: Explanation of the symbol used in the table
○ : Excellent
△ : Passing(with a little problem)
× : Failure

CONSTANT VELOCITY UNIVERSAL JOINT

This is a continuation of application Ser. No. 10/124,732 filed Apr. 18, 2002, now abandoned. The disclosure of the prior application is hereby incorporated by reference herein in its entirety.

BACKGROUND OF THE INVENTION

1. Field of the Invention

The present invention relates to fixed-type constant velocity universal joints to be used in power transmission systems of automobiles and various kinds of industrial machines, each of which only allows an operational angle displacement between a shaft on the power-transmitting side and a shaft on the driven side.

2. Description of the Related Art

Fixed-type constant velocity universal joints (e.g., Rzeppa constant velocity universal joints well known as Birfield universal joints: BJs) have been used for the connection between drive shafts or the like in automobiles. Typically, the conventional fixed-type constant velocity universal joint (hereinafter, simply referred to as the conventional universal joint) comprises: an outer joint member in which curved track grooves are axially formed on its inner circumferential surface with a spherical shape; an inner joint member in which curved track grooves are axially formed on its outer circumferential surface with a spherical shape; a plurality of balls respectively arranged in ball tracks provided as pairs of track grooves of the inner and outer joint members; and a cage having pockets for respectively holding these balls. More specifically, the plurality of balls are arranged in their respective pockets of the cage at regular intervals in a circumferential direction of the joint.

The center of the track groove of the outer joint member is displaced a predetermined distance from the spherical center of the inner circumferential surface. On the other hand, the center of the track groove of the inner joint member is displaced the same distance from the spherical center of the outer circumferential surface in the direction opposite to that of the outer joint member. Here, such a displacement is referred to as a track offset. Therefore, the ball track formed between the outer joint member and the inner-joint member is shaped like a wedge opened toward one end of the joint in the axial direction. In addition, the spherical center of the inner circumferential surface of the outer joint member and the spherical center of the outer circumferential surface of the inner joint member are located within a common plane, i.e., the central plane of the joint that includes the center of each ball.

In the conventional universal joint, the constant velocity of the joint can be ensured because each of the ball held in the pocket of the cage can be always located in a plane that bisects any operational angle when there is an angular displacement between the outer joint member and the inner joint member. Here, the operational angle refers to an angle formed by a rotational axis of the outer joint member and a rotational axis of the inner joint member.

In recent years, there may be cases where a wheel base is lengthened from the viewpoint of improving the safety of automobile in the event of a crash. In this case, however, there is a need to increase a steering angle for front wheels by providing the universal joint with a higher operation angle. For filling the need for such a higher-angle, there is provided another conventional universal joint, i.e., an undercut-free type universal joint (UJ) in which the track grooves on the opening side of the outer joint member are shaped so as to be in parallel with the axial direction of the joint. In this kind of the universal joint, there is no under cut formed on either of the outer joint member or the inner joint member so that a higher operation angle can be attained.

In each kind of the conventional universal joints (BJ, UJ), it is very important to define how to fill a gap between a pitch circle diameter of the track groove of the outer joint member and a pitch circle diameter of the track groove of the inner joint member (hereinafter, such a gap is referred to as a PCD gap). If the PCD gap is too small, it becomes difficult to insert balls into the respective ball tracks and each of the balls is then difficult to roll smoothly as the binding force upon the ball increases. During the rotation of the universal joint, the rolling movement of the ball is caused with sliding contact between the ball and the ball track. As a result of frictional heating, the temperature in the joint increases and hence the lifetime of the joint decreases. If such a gap is too large, on the other hand, the characteristic features of the joint (such as noise, vibration, harshness (NVH), durability) can be affected by the generation of slapping sounds between the pocket and the ball, or more the increase in vibrations of the joint.

Especially, under high-load conditions, the contact ellipse between the ball and the track groove runs off the track groove. Under such circumstances, it could be chipped from such a portion, resulting in flaking. If the PCD gap is small, it is effective to prevent the contact ellipse from running off the track groove. On the other hand, if such a gap is substantially larger than usual, the ball contact point approaches the PCD gap and hence the contact ellipse becomes easy to run off the track groove.

In each of the conventional universal joints (BJ, UJ), furthermore, it is very important to determine the ratio (F/PCR) between the amount of track offset (F) and the length (PCR) of a straight line segment between the center of the track groove in the outer or inner joint member and the center of the ball. In Japanese Patent Laid-Open Publication No. Hei. 9-317784 (1997), for example, there is disclosed an appropriate range of F/PCR (i.e., $0.069 \leq F/PCR \leq 0.121$). In this case, the depth of the track groove becomes shallow if the amount of track offset (F) is too large. Thus, the contact ellipse between the ball and the track groove tends to run off the track groove, causing the decrease in allowable load torque at a higher operational angle region. In addition, columns of the cage become narrow, so that the strength of the cage can be also decreased. On the contrary, if the amount of track offset (F) is too small, the track load increases. It causes the decrease in the durability of the joint in addition to lowering of the maximum operational angle.

Typically, the conventional universal joint has six balls (hereinafter, such a joint will be also referred to as a six-ball joint). However, there is an alternative universal joint having eight balls for the purpose of realizing a smaller and lighter version of the joint while retaining at least the same properties (e.g., strength, load capacity, and durability) as those of the joint using six balls. Here, the universal joint having eight balls will be also referred to as an eight-ball joint. The eight-ball joint has its own basic configuration different from that of the six-ball joint. In this case, the set value of the PCD gap may be peculiar to such a configuration. The amount of track offset (F) and the length PCR of a straight line segment between the center of the track groove of the outer or inner joint member and the center of the ball are also adjusted such that the ratio F/PCR can be defined within the above appropriate range. It is noted that the depth of the track groove of the eight-ball joint is smaller than that of the six-ball joint as the diameter of each of the eight balls is smaller than that of the six balls. In the eight-ball joint, the PCD gap exerts a very large influence on the durability of the joint. Consequently, there is a limit to improve the durability of the eight-ball joint by means of adjusting the above F/PCR in the appropriate range.

SUMMARY OF THE INVENTION

It is an object of the present invention is to provide an eight-ball joint with the improved durability under high-loaded conditions, which minimize the variations in lifetimes of the joints.

According to a fist aspect of the present invention, there is provided a constant velocity universal joint comprising: an outer joint member having eight curved track grooves axially extending along an inner circumferential surface with a spherical shape; an inner joint member having eight curved track grooves axially extending along an outer circumferential surface with a spherical shape; eight balls respectively arranged in eight ball tracks provided as pairs of the track grooves of the outer joint member and the track grooves of the inner joint member; and a cage having pockets for respectively holding the balls, where a center of each track groove of the outer joint member is axially displaced a predetermined distance from a spherical center of the inner circumferential surface, while a center of each track groove of the inner joint member is axially displaced the same distance from a spherical center of the outer circumferential surface in a direction opposite to that of the outer joint member, wherein a PCD gap in the ball track is in a range of 5 µm to 50 µm. Here, the "PCD gap" refers to the difference between a pitch circle diameter of the track groove of the outer joint member and a pitch circle diameter of the track groove of the inner joint member. The present invention can be applied to a constant velocity universal joint with each of track grooves of the outer and inner joint members having a linear bottom as a straight portion.

According to the first aspect of the present invention, the PCD gap in the ball track is set in the range 5 µm to 50 µm, so that under high-load conditions the contact ellipse between the ball and the track groove is difficult to run off the track groove. Therefore, it becomes possible to easily prevent the generation of chipping or flaking, allowing the increase in the durability and also stabilizing the variations in life of the universal joints. Especially, in the case of the eight-ball joint, the durability can be significantly improved by the PCD gap because of a smaller diameter of the ball that allows a relatively shallow depth of the track groove.

In the first aspect of the present invention, it is preferable to make a gap between the pocket of the cage and the ball in an axial direction so as to be in a range of –30 µm to +10 µm. There is a wearing down of the wall of the pocket of the cage in the axial direction because of the contact between the ball and the wall, so that the gap in the axial direction may excessively increase as long as it is continuously used, except at the early stages. Furthermore, the dimensions of each structural components of the universal joint have unavoidable dimensional variations within manufacturing tolerance.

In the eight-ball joint in accordance with the first aspect of the present invention, the abrasion loss of the pocket is comparably small as the load to be applied on the pocket with respect to one ball is smaller than that of the six-ball joint. Therefore, the smooth rolling of the ball can be ensured with reducing the binding force of the ball in the pocket. That is, the gap in the axial direction is positively shifted with respect to that of the six-ball joint (a gap in the axial direction of –50 µm to –10 µm). Thus, the gap in the axial direction in accordance with the present invention may be in the range of –30 µm to +10 µm, preferably in the range of –10 µm to +10 µm, for preventing the increase in temperature of the inside of the joint by lowering the amount of heat liberated from the contact between the ball and the pocket. As a result, the durability of the joint can be increased.

In the above configuration of the universal joint, the gap between the cage and the outer joint member or between the cage and the inner joint member in a radial direction of the joint may be in a range of 20 µm to 100 µm. Therefore, the operating characteristics between the cage and the outer joint member or between the cage and the inner joint member can be improved. In addition, the generation of slapping sounds between the cage and the outer joint member or between the cage and the inner joint member can be prevented. Furthermore, the increase in vibrations of the joint can be also prevented.

In a second aspect of the present invention, there is provided a constant velocity universal joint; comprising: an outer joint member having eight curved track grooves axially extending along an inner circumferential surface with a spherical shape; an inner joint member having eight curved track grooves axially extending along an outer circumferential surface with a spherical shape; eight balls respectively arranged in eight ball tracks provided as pairs of the track grooves of the outer joint member and the track grooves of the inner joint member; and a cage having pockets for respectively holding the balls, where a center of each track groove of the outer joint member is axially displaced a predetermined distance from a spherical center of the inner circumferential surface, while a center of each track groove of the inner joint member is axially displaced the same distance from a spherical center of the outer circumferential surface in a direction opposite to that of the outer joint member, wherein a ratio (F/PCR) of an amount (F) of displacement (i.e., the amount of track offset) and a length (PCR) of a line segment between the center of the track groove of the outer joint member or the center of the track groove of the inner joint member and a center of the ball is in a range of $0.069 \leq F/PCR \leq 0.121$, and a contact angle of each of the track grooves of the outer joint member and the inner joint member and the corresponding ball is 37° or less. Also, the present invention is applicable to a constant velocity universal joint where each of the track grooves of the outer joint member and the inner joint member has a bottom with a linear shape provided as a straight portion.

The second aspect of the present invention is predicted on the universal joint being designed to have an appropriate ratio (F/PCR) of the amount (F) of the displacement (i.e., the amount of track offset) and the length (PCR) of a line segment between the center of the track groove of the outer joint member or the center of the track groove of the inner joint member and the center of the ball in the range of $0.069 \leq F/PCR \leq 0.121$, as disclosed in Japanese Patent Laid-Open Publication No. Hei. 9-317784 (1997). Thus, the present invention is constructed such that a contact angle of each of the track grooves of the outer joint member and the inner joint member and the corresponding ball is 37° or less and the ratio F/PCR is appropriately defined in the above range. Therefore, the contact ellipse between the ball and the track groove becomes difficult to run off the track groove. In addition, there is no clearance of the ball in the ball track at an operational angle less than a normal angle to be applied in the automobile or the like, avoiding the generation of slapping sounds.

By narrowing the contact angle between the track groove and the ball, therefore, the pressure on the contact surface between the track groove and the ball can be increased. However, if the contact angle becomes too small, the durability of the joint may be decreased. For that reason, the lower limit of the contact angle between the track groove and the ball may be defined such that the pressure on the contact surface at the time of loading the basic torque becomes 2.7 GPa or less. Consequently, the durability of the universal joint of the present invention is equal to or more excellent than that of the conventional universal joint. Here, the term "basic torque" means torque that allows a lifetime of 1,500 hours at 100 rpm with a torque value defined from the contact stress (Herz's stress) between the track groove and the ball (basic torque used for the calculation of lifetime of the universal joint).

Here, it is preferable to define the contact angle between the track groove and the ball in a range of 29° to 37°. Therefore, when the contact angle between the track groove and the ball is 29° or more, the pressure on the contact surface between the track groove and the ball can be held under control. Consequently, the durability of the universal joint of the present invention is equal to or more excellent than that of the conventional universal joint.

The nature, principle, and utility of the invention will become more apparent from the following detailed description when read in conjunction with the accompanying drawings in which like, parts are designated by like reference numerals or characters.

BRIEF DESCRIPTION OF THE DRAWINGS

In the accompanying drawings:

FIG. 4 is a graph that illustrates the results of the endurance test under high-loaded conditions with respect to the PCD gap;

FIG. 5 is a graph that illustrates the results of the endurance test with respect to the gap in the pocket of the cage in the axial direction;

DETAILED DESCRIPTION OF THE PREFERRED EMBODIMENTS

Figure 1:
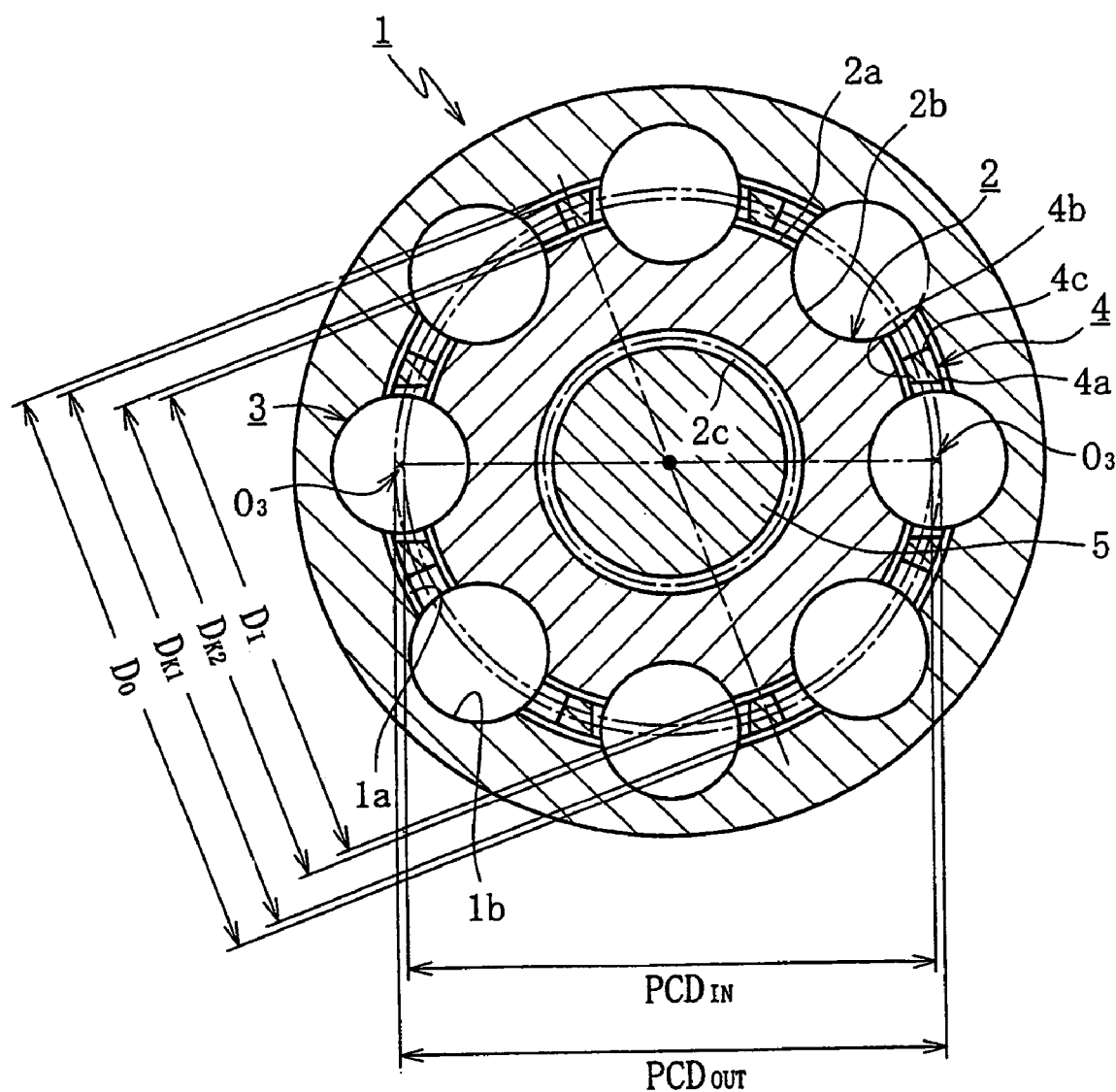
FIG. 1 is a cross sectional view taken along the line A—A in FIG. 2 or the line B—B in FIG. 3 for illustrating a constant velocity universal joint as one preferred embodiment of the present invention.
Figure 2:
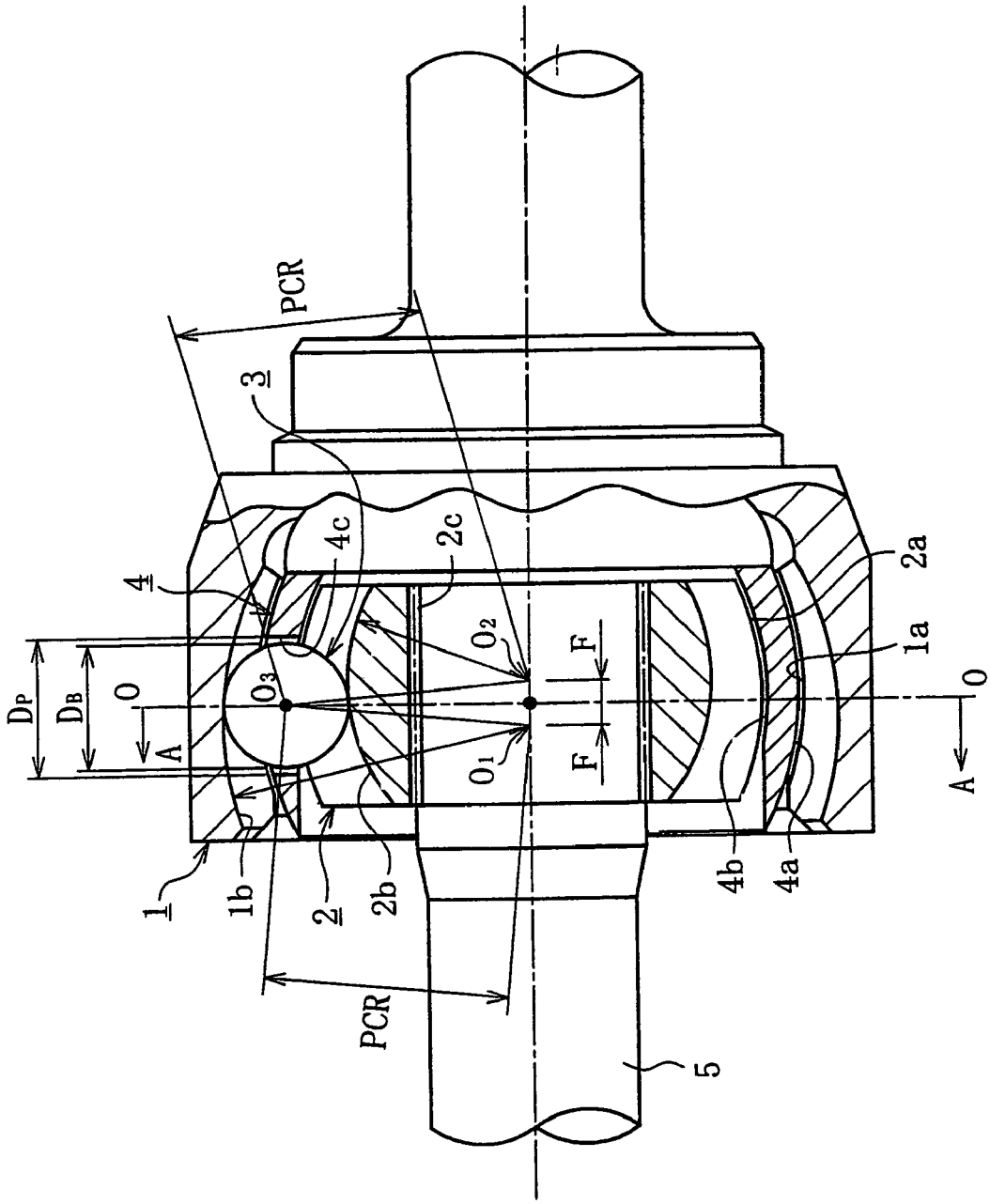
FIG. 2 is a cross sectional view of the Rzeppa constant velocity universal joint (BJ) as one embodiment of the present invention.
Figure 3:
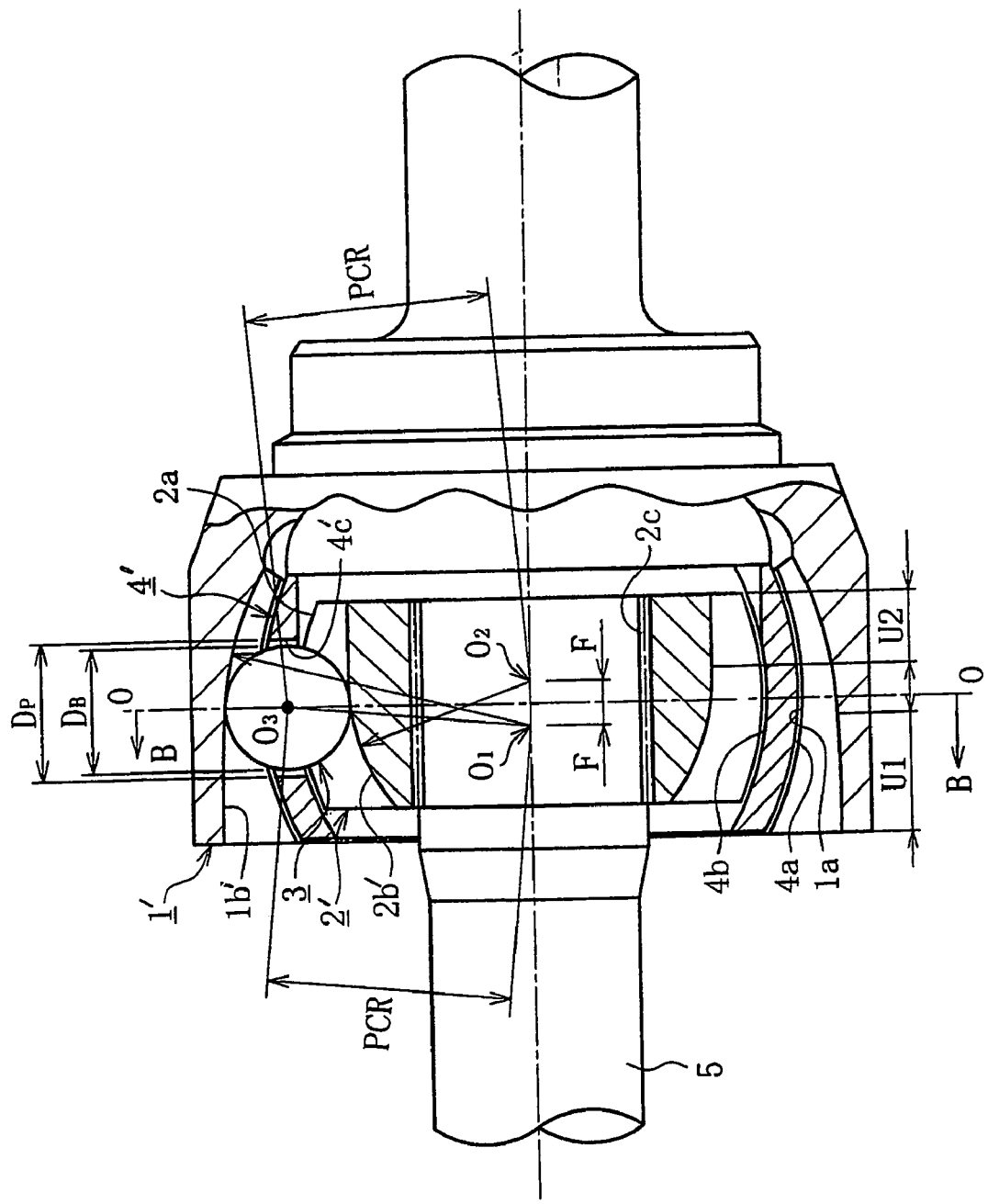
FIG. 3 is a cross sectional view of the undercut-free constant velocity universal joint (UJ) as another preferred embodiment of the present invention.
Figure 6:
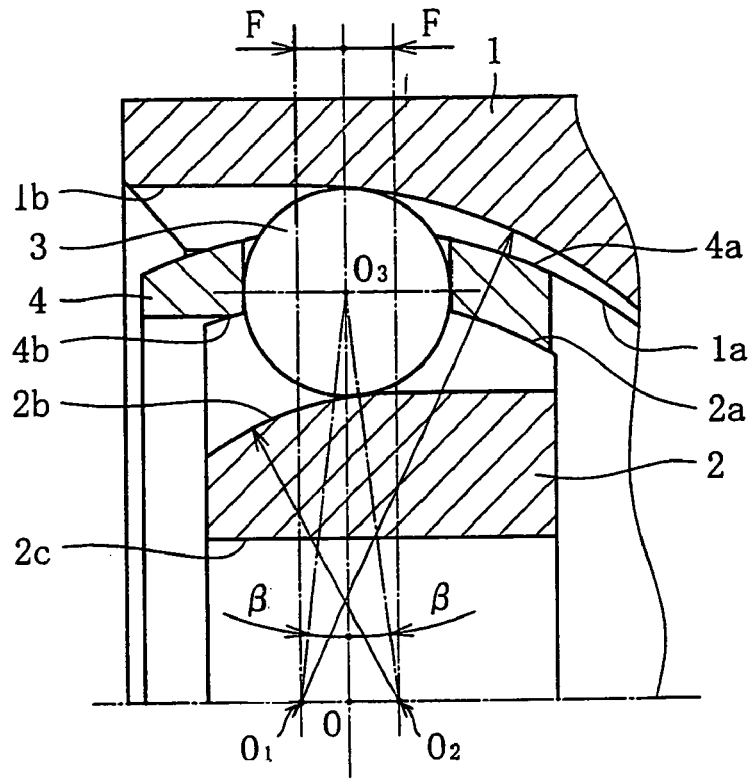
FIG. 6 is an enlarged cross sectional view of the main part of the constant velocity universal joint shown in FIG. 3 for explaining the track offset angle.

FIG. 2 illustrates a Rzeppa fixed-type constant velocity universal joint (BJ) and FIG. 3 illustrates an undercut-free fixed-type constant velocity universal joint (UJ), respectively. The cross sectional view taken along the line A—A in FIG. 2 and the cross sectional view taken along the line B—B in FIG. 3 are identical to each other, so that FIG. 1 is provided as their common cross sectional view.

The universal joint (BJ) shown in FIG. 2 as a first embodiment of the present invention comprises an outer joint member 1 having eight curved track grooves 1b axially extending along an inner circumferential surface 1a with a spherical shape; an inner joint member 2 having eight curved track grooves 2b axially extending along an outer circumferential surface 2a with a spherical shape and also having a serrated fitting portion 2c between the end of a middle shaft part 5 of a drive shaft and the inner circumferential surface 1a, eight balls 3 arranged in respective eight ball tracks formed as pairs of the track grooves 1b of the outer joint member 1 and the track grooves 2b of the inner joint member 2, and a cage 4 having pockets 4c for respectively holding the balls 3 at regular intervals in a circumferential direction.

The center $O_1$ of the track groove 1b of the outer joint member 1 is axially displaced a predetermined distance F from the spherical center of the inner circumferential surface 1a, while the center $O_2$ of the track groove 2b of the inner joint member 2 is axially and oppositely (i.e., in the figure, the center $O_1$ is the opening side of the joint, and the center $O_2$ is the recess side of the joint) displaced the same distance F from the spherical center of the outer circumferential surface 2a (i.e., track offset). Therefore, the ball track formed between the outer joint member 1 and the inner joint member 2 is shaped like a wedge opened to one side in the axial direction (i.e., in the figure, the opening side of the joint).

Both the spherical center of an outer circumferential surface 4a of the cage 4 and the spherical center of the inner circumferential surface 1a of the outer joint member 1 to be provided as a guide surface of the outer circumferential surface 4a of the cage 4 are located within a central plane O of the joint including the center $O_3$ of the ball 3. In addition, both the spherical center of an inner circumferential surface 4b of the cage 4 and the spherical center of the outer circumferential surface 2a of the inner joint member 2 to be provided as a guide surface of the inner circumferential surface 4b of the cage 4 are located within the central plane O. Therefore, the amount of track offset F in the center $O_1$ of the track groove 1b in the outer joint member 1 corresponds to the distance from the center $O_1$ to the central plane O of the joint in the axial direction. On the other hand, the amount of track offset F of the center $O_2$ of the track groove 2b in the inner joint member 2 corresponds to the distance from the center $O_2$ to the central plane O of the joint and is equal to the amount of track offset F in the center $O_1$ of the track groove 1b.

In this embodiment, furthermore, the spherical centers of the outer circumferential surface 4a and the inner circumferential surface 4b of the cage 4 and the center $O_3$ of the ball 3 are arranged in a line on a common plane perpendicular to the axial direction. Alternatively, these centers may be oppositely displaced the same distance in the axial direction with respect to the center $O_3$ of the ball 3. p The universal joint (UJ) shown in FIG. 3 is another embodiment of the present invention and includes the same structural components except of straight portions U1, U2. That is, the straight portion U1 is formed as a linear bottom portion in cross section of the track groove 1b of the outer joint member 1, while the straight portion U2 is formed as a linear bottom portion in cross section of the track groove 2b of the inner joint member 2. Therefore, the explanations of the same structural components as those in FIG. 2 will be omitted in the following description. The straight portions U1, U2 formed on the track grooves 1b', 2b' of the outer joint member 1' and the inner joint member 2' in the universal joint (UJ) of the present embodiment allow the maximum operational angle larger than that of the universal joint (BJ) shown in FIG. 2. In each of the universal joints (BJ, UJ) shown in FIGS. 2 and 3, when the outer joint member 1, 1' and the inner joint member 2, 2' undergo angular displacements with respect to each other, the constant velocity of the joint can be ensured as each of the ball held in the pocket 4c, 4c' of the cage 4, 4' can be always located in a plane that bisects any operational angle.

In each of the universal joints (BJ, UJ) shown in FIGS. 2 and 3, furthermore, a PCD gap with respect to the ball track shown in FIG. 1, i.e., the difference between a pitch circle diameter $PCD_{OUT}$ of the track groove 1b, 1b' of the outer joint member 1, 1' and a pitch circle diameter $PCD_{IN}$ of the track groove 2b, 2b' of the inner joint member 2, 2', is defined within the range of 5 µm to 50 µm. If the PCD gap becomes smaller than 5 µm, it becomes difficult to place the balls 3 into the pairs of track grooves 1b, 1b', 2b, 2b' and to maintain the stable operation of the joint. If the PCD gap becomes larger than 50 µm, then the improvement in the durability of the joint becomes difficult as the contact ellipse between the ball 3 and the track grooves 1b, 1b', 2b, 2b' tends to run off the track grooves 1b, 1b', 2b, 2b'.

As shown in FIGS. 2 and 3, furthermore, the gap between the pocket 4c, 4c' of the cage 4, 4' and the ball 3 in the axial direction, i.e., the difference between the axial dimension ($D_P$) of the pocket 4c, 4c' and the diameter ($D_B$) of the ball 3, is defined within the range of −30 µm to +10 µm, preferably of −10 µm to +10 µm. If the interference (negative gap) between the pocket 4c, 4c' of the cage 4, 4' and the ball 3 is smaller than −30 µm, the binding force of the ball 3 increases to prevent a smooth rolling movement of the ball 3. During the rotation of the universal joint, therefore, the rolling movement of the ball 3 is caused with sliding contact between the ball 3 and the track grooves 1b, 2b. As a result of frictional heating, the temperature in the joint increases and hence the lifetime of the joint decreases. On the other hand, if the clearance (positive gap) between the pocket 4c, 4c' of the cage 4, 4' and the ball 3 is larger than +10 µm, undesired effects for the joint performance can be generated. For example, slapping sounds can be generated between the pocket 4, 4c' and the ball 3, or more vibrations can be generated by the joint.

Furthermore, as shown in FIG. 1, the gap between the cage 4 and the outer joint member 1 in the radial direction (i.e., the difference between the inner diameter ($D_O$) of the outer joint member 1 and the external diameter ($D_{K1}$) of the cage 4) is defined within the range of 20 µm to 100 µm. On the other hand, the gap between the cage 4 and the inner joint member 2 in the radial direction (i.e., the difference between the inner diameter ($D_{K2}$) of the cage 4 and the outer diameter ($D_I$) of the inner joint member 2) is defined within the range of 20 to 100 µm. If each of the gaps in the radial direction is smaller than 20 µm, the operating characteristics between the cage 4 and the outer joint member 1 or between the cage 4 and the inner joint member 2 becomes worse. On the other hand, if each of the gaps in the radial direction is larger than 100 µm, undesired effects for the joint performance can be generated. For example, slapping sounds can be generated between the cage 4 and the outer joint member 1 or between the cage 4 and the inner joint member 2, or more vibrations can be generated by the joint.

For evaluating the above PCD gap, an endurance test under high-loaded conditions was performed on the Rzeppa constant velocity universal joint (BJ) having eight balls as shown in FIG. 2. The results obtained from such a test are listed in FIG. 4. The test was performed using two universal joints A, B as test articles for evaluating each of the different PCD gaps. That is, each of the test joints A, B was driven under the conditions in which load torque T=726 N·m, the number of revolutions N=230 rpm, and operational angle θ=6 deg. Subsequently, the time that elapsed before generating any problem in the test article was measured.

As is evident from the results shown in FIG. 4, each of the universal joints with PCD gaps of 30 µm and 50 µm ensured the stable durability. On the other hand, each of those with the PCD gaps of 70 µm and 100 µm met the desired spec but expressed variations in lifetimes. In addition, the universal joint with the PCD gap of 120 µm was the limit to meet the desired spec. Furthermore, it was difficult to meet the desired spec when the universal joint with the PCD gap 130 µm was tested.

For evaluating the gap between the pocket 4c of the cage 4 and the ball 3 in the axial direction, an endurance test was performed on the Rzeppa universal joint (BJ) shown in FIG. 2. The results obtained from such a test are listed in FIG. 5. The test was performed using two universal joints A, B as test articles for evaluating each of the joints having different gaps in the axial direction. That is, each of the test joints A, B was driven under the conditions in which load torque T=186 N·m, the number of revolutions N=1700 rpm, and operational angle θ=6 deg. Subsequently, the time that elapsed before generating any problem in the test article was measured.

As is evident from the results shown in FIG. 5, each of the universal joints having the gaps of −20 µm and −30 µm in the radial direction ensured the stable durability. On the other hand, the universal joint having the gap of −45 µm in the radial direction showed poor durability and variations in lifetimes.

In each of the universal joints shown in FIGS. 2 and 3, the length (PCR) of a line segment between the center $O_1$ of the track groove 1b of the outer joint member 1 and the center $O_3$ of the ball 3 is equal to the length (PCR) of a line segment between the center $O_2$ of the track groove 2b of the inner joint member 2 and the center $O_3$ of the ball 3. In the universal joint shown in FIG. 3, an offset angle which the line segment between the center $O_1$ of the track groove 1b of the outer joint member 1 and the center $O_3$ of the ball 3 forms with a line segment between the center O of the joint and the center $O_3$ of the ball 3 is defined as β. Similarly, an offset angle which the line segment between the center $O_2$ of the track groove 2b of the inner joint member 2 and the center $O_3$ of the ball 3 forms with the line segment between the center O of the joint and the center $O_3$ of the ball 3 is also defined as β. Thus, both offset angles are equal to each other.

The amount of track offset (F) of each of the track grooves 1b, 2b of the outer and inner joint members 1, 2 is defined such that the ratio F/PCR is in the range of 0.069≦F/PCR≦0.121, where the PCR is the length of a line segment between the center $O_1$ of the track groove 1b of the outer joint member 1 or the center $O_2$ of the track groove 2b of the inner joint member 2 and the center $O_3$ of the ball 3. Consequently, the allowable load torque, the durability, the maximum operational angle, and the cage strength can be ensured, and also the track load can be decreased. In this embodiment, the ratio F/PCR is defined as F/PCR=0.104 (or 0.1038), which is substantially lower than the typical F/PCR value (i.e., F/PCR=0.14) of the conventional six-ball joint.

Figure 7:
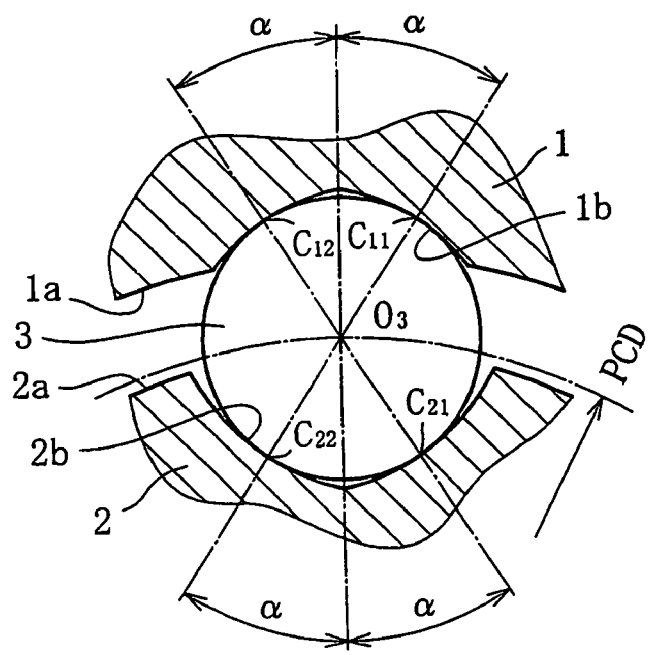
FIG. 7 is an enlarged cross sectional view of the main part of the constant velocity universal joint shown in FIG. 3 for explaining the contact angle between the track groove and the ball.

As described above, the universal joint of the present embodiment has eight balls. Comparing with the six-ball joint, therefore, the load to be applied on one ball in the universal joint of the present embodiment forms a small portion of the total amount of load. It means that the diameter of each ball 3 of the present embodiment can be smaller than that of the conventional six-ball joint. FIG. 7 is a partially enlarged cross sectional view of part of the universal joint including the outer joint member 1, the inner joint member 2, and the ball 3. As shown in the figure, the track groove 1b is axially formed on the inner circumferential surface 1a of the outer joint member 1, while the track groove 2b is axially formed on the outer circumferential surface 2a of the inner joint member 2. Each of these track grooves 1b, 2b is shaped like Gothic arch in its lateral cross section.

Thus, the ball 3 touches the track groove 1b of the outer joint member 1 at two points $C_{11}$, $C_{12}$ and also touches the track groove 2b of the inner joint member 2 at two points $C_{21}$, $C_{22}$. Here, a contact angle is defined as an angle $\alpha$ formed by a first line segment passing through the center $O_3$ of the ball 3 and the center O of the joint and a second line segment passing through one of the contact points $C_{11}$, $C_{12}$, $C_{21}$, and $C_{22}$ between the ball 3. As shown in the figure, the contact angles $\alpha$ formed of the line segments between the contact points $C_{11}$, $C_{12}$, $C_{21}$, $C_{22}$ and the center $O_3$ of the ball 3 are equal to each other. In other words, the contact angles $\alpha$ at contact points $C_{11}$, $C_{12}$, $C_{21}$, $C_{22}$ are equal to each other and defined within the range of 29° to 37°. It is noted that the contact angle $\alpha$ (29° to 37°) of the present eight-ball joint is comparatively smaller than the contact angle (37° to 45°) of the conventional six-ball joint.

Figure 8:
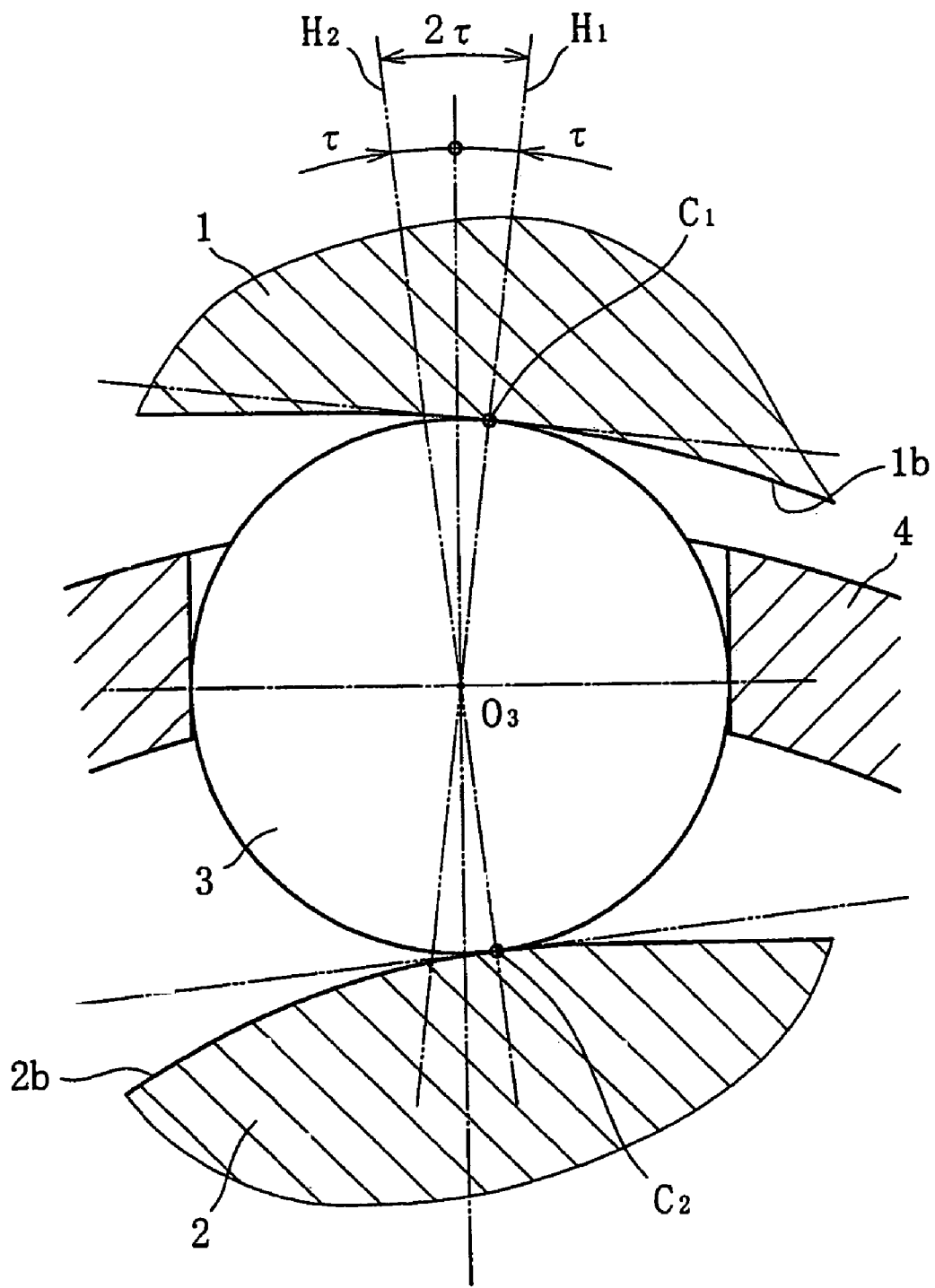
FIG. 8 is an enlarged cross sectional view of the main part of the constant velocity universal joint shown in FIG. 3 for explaining the wedge angle.

FIG. 8 is provided for illustrating a wedge angle $2\tau$ of the present universal joint. The wedge angle $2\tau$ is an angle provided for initiating the flip of the wedge in the present universal joint. In other words, the wedge angle is formed by the common normal $H_1$ at the contact point $C_1$ between the ball 3 and the track groove 1b of the outer joint member 1 and the common normal $H_2$ at the contact point $C_2$ between the ball 3 and the track groove 2b.

As shown in FIG. 8, the contact point $C_1$ between the track groove 1b of the outer joint member 1 and the ball 3 is positioned with an inclination by the curved track groove 1b at an angle of $\tau$ with respect to the center O of the joint passing through the center $O_3$ of the ball 3. Also, the contact point $C_2$ between the track groove 2b of the inner joint member 2 and the ball 3 is positioned with an inclination by the curved track groove 2b at an angle of $\tau$ with respect to the center O of the joint passing through the center $O_3$ of the ball 3. Therefore, the wedge angle $2\tau$ is provided by adding both angles $\tau$ together. If the operational angle of the joint increases, the wedge angle $2\tau$ decreases with a certain phase and finally the wedge can be flipped over.

If the amount of track offset decreases, then the wedge angle $2\tau$ decreases. In this case, however, it allows the ball 3 to move freely in the ball track at the time of flipping the wedge over, raising the possibility of generating slapping sounds. For avoiding such a possibility, the contact angle $\alpha$ between each of the track grooves 1b, 2b and the ball 3 may be defined as 37° or less as described above to set the wedge angle $2\tau$ to at least a normal angle (generally at 9°) or more to be applied in the automobile or the like.

The following table 1 provides a summary of the relationship among the ratio F/PCR, the contact angle $\alpha$, and the wedge angle $2\tau$. As described above, F denotes the amount of track offset and PCR denotes the length of a line segment between the center $O_1$ of the track groove 1b of the outer joint member 1 or the center $O_2$ of the track groove 2b of the inner joint member 2 and the center $O_3$ of the ball 3.

TABLE 1

| Ratio of offset amount to PCR F/PCR | Contact angle $\alpha$ | Wedge angle $2\tau$ |
|---|---|---|
| 0.069 | 45° | 8° |
|  | 37° | 10° |
|  | 29° | 14° |
| 0.121 | 45° | 14° |
|  | 37° | 18° |
|  | 29° | 25° |

As is evident from the above table, it is found that the wedge angle $2\tau$ increases as the contact angle $\alpha$ decreases. Also, the wedge angle $2\tau$ increases with an increasing amount of offset F. Therefore, the ratio (F/PCR) of the amount of track offset F and the length of the line segment between the center $O_1$ of the track groove 1b of the outer joint member 1 or the center $O_2$ of the track groove 2b of the inner joint member 2 and the center $O_3$ of the ball 3 should be set within the range of $0.069 \leq F/PCR \leq 0.121$ in addition to provide $\alpha$ contact angle $\alpha$ of 37° or less, which is formed by the ball 3 and each of the track grooves 1b, 2b. As a result, the contact ellipse between the ball 3 and the track groove 1b or 2b becomes difficult to run off the track groove 1b or 2b, and substantially no clearance between the ball 3 and the ball track can be found at the contact angle $\alpha$ equal to or less than the normal angle of the automobile or the like. Therefore, the generation of slapping sounds can be prevented.

If the contact angle $\alpha$ formed by the ball 3 and each of the track grooves 1b, 2b decreases, simultaneously the distance from the contact point to the corner (i.e., up to the connection part of the track groove and the inner diameter) increases. As a result, the allowable load torque can be increased. In this case, however, the pressure on the contact surface between the track groove 1b or 2b and the ball 3 increases. If the contact angle $\alpha$ is too small, the joint can be resulted in poor durability. Therefore, the contact angle $\alpha$ between the ball 3 and each the track grooves 1b, 2b should be defined such that the pressure on the contact surface at the time of loading the basic torque is 2.7 GPa or less. Such a configuration of the universal joint allows the durability which is equal to or more than the durability of the conventional universal joint. According to the present embodiment, the contact angle $\alpha$ between the ball 3 and each of the track grooves 1b, 2b of the outer and inner joint members 1, 2 is set to 29° or more, so that the pressure on the contact surface between the track groove 1b or 2b and the ball 3 can be suppressed, allowing the same or more excellent durability compared with that of the conventional one.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A constant velocity universal joint, comprising:
an outer joint member having eight curved track grooves axially extending along an inner circumferential surface with a spherical shape;
an inner joint member having eight curved track grooves axially extending along an outer circumferential surface with a spherical shape;

eight balls respectively arranged in eight ball tracks provided as pairs of the track grooves of the outer joint member and the track grooves of the inner joint member; and a cage having pockets for respectively holding the balls, a center of each track groove of the outer joint member being axially displaced a predetermined distance from a spherical center of the inner circumferential surface, a center of each track groove of the inner joint member being axially displaced the same distance from a spherical center of the outer circumferential surface in a direction opposite to that of the outer joint member, wherein a pitch circle diameter gap is in a range of 5 μm to 50 μm.

2. The constant velocity universal joint according to claim 1, wherein each of the track grooves of the outer joint member and the inner joint member has a bottom with a linear shape provided as a straight portion.

3. A constant velocity universal joint, comprising:

an outer joint member having eight curved track grooves axially extending along an inner circumferential surface with a spherical shape;

an inner joint member having eight curved track grooves axially extending along an outer circumferential surface with a spherical shape;

eight balls respectively arranged in eight ball tracks provided as pairs of the track grooves of the outer joint member and the track grooves of the inner joint member; and a cage having pockets for respectively holding the balls, a center of each track groove of the outer joint member being axially displaced a predetermined distance from a spherical center of the inner circumferential surface, a center of each track groove of the inner joint member being axially displaced the same distance from a spherical center of the outer circumferential surface in a direction opposite to that of the outer joint member, wherein a pitch circle diameter gap is in a range of 5 μm to 50 μm and wherein a gap between each of the pockets of the cage and the ball in an axial direction is in a range of −30 μm to +10 μm.

4. A constant velocity universal joint, comprising:

an outer joint member having eight curved track grooves axially extending along an inner circumferential surface with a spherical shape;

an inner joint member having eight curved track grooves axially extending along an outer circumferential surface with a spherical shape;

eight balls respectively arranged in eight ball tracks provided as pairs of the track grooves of the outer joint member and the track grooves of the inner joint member; and a cage having pockets for respectively holding the balls, a center of each track groove of the outer joint member being axially displaced a predetermined distance from a spherical center of the inner circumferential surface, a center of each track groove of the inner joint member being axially displaced the same distance from a spherical center of the outer circumferential surface in a direction opposite to that of the outer joint member, wherein a pitch circle diameter gap is in a range of 5 μm to 50 μm and, wherein a gap between the cage and the outer joint member or the inner joint member in a radial direction is in a range of 20 μm to 100 μm.

5. A constant velocity universal joint, comprising:

an outer joint member having eight curved track grooves axially extending along an inner circumferential surface with a spherical shape;

an inner joint member having eight curved track grooves axially extending along an outer circumferential surface with a spherical shape;

eight balls respectively arranged in eight ball tracks provided as pairs of the track grooves of the outer joint member and the track grooves of the inner joint member; and a cage having pockets for respectively holding the balls, a center of each track groove of the outer joint member being axially displaced a predetermined distance from a spherical center of the inner circumferential surface, a center of each track groove of the inner joint member being axially displaced the same distance from a spherical center of the outer circumferential surface in a direction opposite to that of the outer joint member, wherein a ratio (F/PCR) of an amount (F) of a displacement and a length (PCR) of a line segment between the center of the track groove of the outer joint member or the center of the track groove of the inner joint member and the center of the ball is in a range of $0.069 \leqq F/PCR \leqq 0.121$, and a contact angle of each of the track grooves of the outer joint member and the inner joint member and the corresponding ball is 37° or less, wherein the lower limit of the contact angle of each of the track grooves of the outer joint member and the inner joint member and the corresponding ball is defined such that the pressure on the contact surface at the time of loading the basic torque becomes 2.7 Gpa or less.

6. The constant velocity universal joint according to claim 5, wherein each of the track grooves of the outer joint member and the inner joint member has a bottom with a linear shape provided as a straight portion.

7. The constant velocity universal joint according to claim 5 or claim 6, wherein the contact angle of each of the track grooves of the outer joint member and the inner joint member and the corresponding ball is in the range of 29° to 370°.

* * * * *